F. R. SUTTON.
TOPPING DEVICE FOR SUGAR BEETS.
APPLICATION FILED JULY 18, 1913.
1,101,584.
Patented June 30, 1914.
2 SHEETS—SHEET 1.
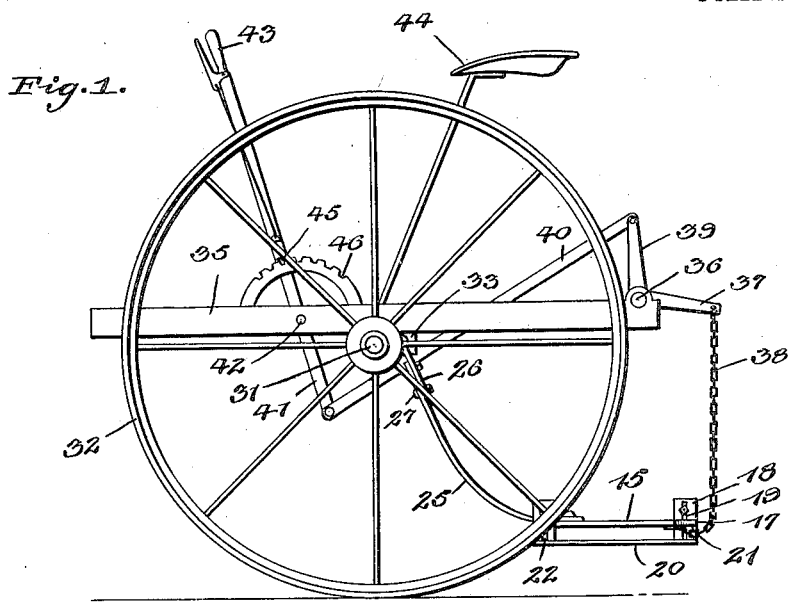
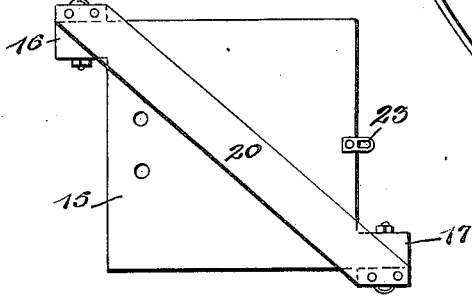
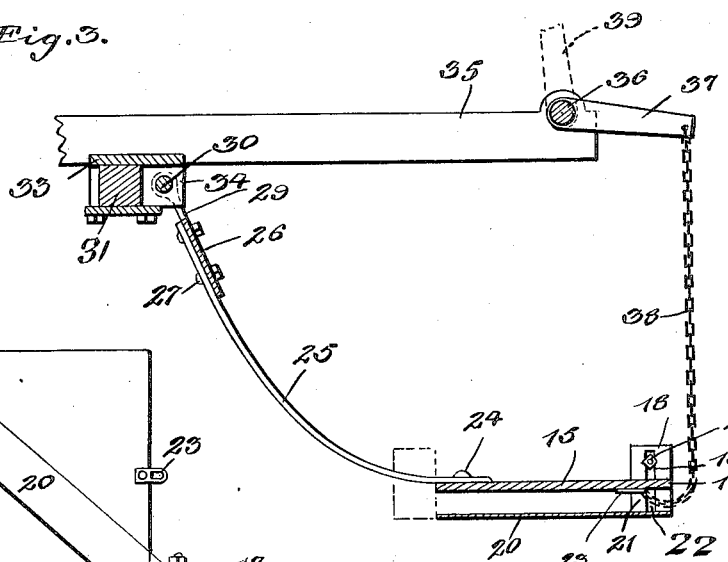
Inventor
F. R. Sutton,
Witnesses
By Victor J. Evans
Attorney F. R. SUTTON.
TOPPING DEVICE FOR SUGAR BEETS.
APPLICATION FILED JULY 18, 1913.
1,101,584.
Patented June 30, 1914.
2 SHEETS—SHEET 2.
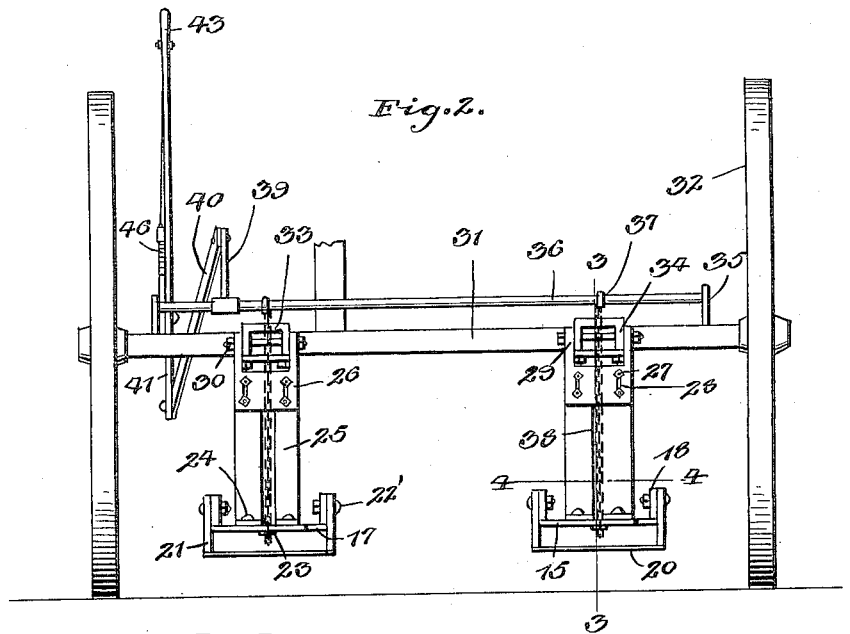
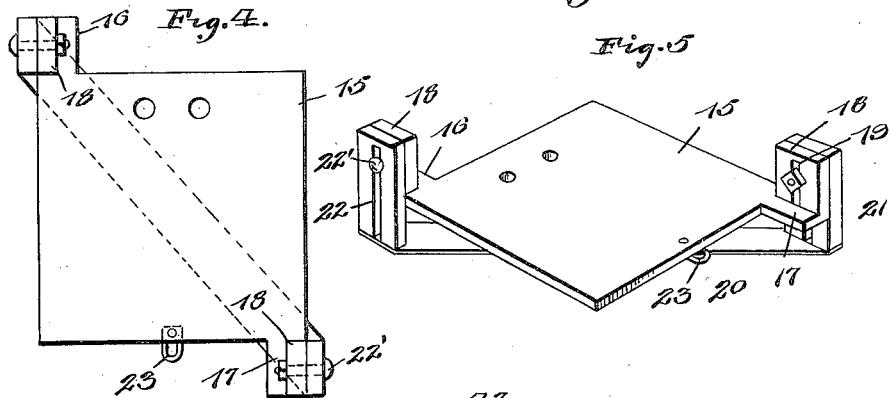
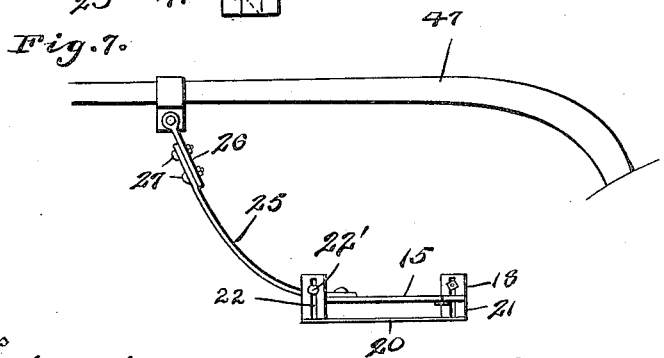
Witnesses
Inventor
F. R. Sutton,
By Victor J. Evans
Attorney

UNITED STATES PATENT OFFICE.

FRANK R. SUTTON, OF TEXAS CITY, TEXAS.

TOPPING DEVICE FOR SUGAR-BEETS.

1,101,584.      Specification of Letters Patent.      Patented June 30, 1914.

Application filed July 18, 1913. Serial No. 779,864.

*To all whom it may concern:*

Be it known that I, FRANK R. SUTTON, a citizen of the United States, residing at Texas City, in the county of Galveston and State of Texas, have invented new and useful Improvements in Topping Devices for Sugar-Beets, of which the following is a specification.

This invention relates to topping devices for sugar beets, and it has for its object to produce a simple and efficient device whereby the tops may be removed from the beet roots while the latter are still in the ground, the removal of the tops being effected evenly and accurately without packing or injuring the beets and without removing more or less than the exact portion required.

A further object of the invention is to produce a topping unit, one or more of which may be used in connection with a suitable frame or carrying device.

A further object of the invention is to simplify and improve the construction of the topping unit, especially as regards the adjustability of the cutting member that serves to sever the tops from the beets.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings, Figure 1 is a side elevation of a beet topping machine constructed in accordance with the invention, said machine being adapted to carry several topping units. Fig. 2 is a rear elevation of said machine. Fig. 3 is a sectional view taken on the line 3—3 in Fig. 2. Fig. 4 is a sectional view taken on the line 4—4 in Fig. 2. Fig. 5 is a perspective view of one of the topping knives detached. Fig. 6 is a bottom plan view of the same. Fig. 7 is a diagrammatic view showing a topping unit connected with a plow beam.

Corresponding parts in the several figures are denoted by like characters of reference.

Each topping unit includes a base plate 15 of substantially rectangular shape provided at diagonally opposite corners with lugs, one of which 16 projects forwardly and the other, 17, rearwardly with respect to the base plate. Each of said lugs is provided with upwardly extending vertical posts 18 which are spaced apart so as to form slots 19 intermediate said posts. A knife or cutter 20 is provided, the same extending diagonally beneath the base plate 15, and said knife being provided at the ends thereof with upwardly extending ears 21 having vertical slots 22 which are disposed in alinement with slots 19 for the passage of bolts or fastening members 22', whereby the knife may be secured in position beneath the base plate and suitably spaced from the latter, it being evident that the space between the knife and the base plate may be varied by proper adjustment of the bolts 22'. The base plate is provided at the rear edge thereof with a staple 23. The front portion of the base is connected by means of fastening members, such as rivets 24, with a curved upwardly and forwardly extending resilient standard 25 having at its upper end an extension member 26 which is adjustably connected therewith by bolts 27 for the passage of which slots 28 are provided. The extension member 26 is provided with apertured ears 29 for the passage of a transverse bolt 30.

A carrying structure for a plurality of topping units is provided including an axle 31 which may be of any desired length to support two or more units. The axle is provided with ground wheels 32, and the topping units are connected adjustably with the axle in order that they may be variously spaced apart according to the distance between the rows of beets that are to be operated upon. For the purpose of connecting the topping units with the axle clips 33 are provided, each of said clips being provided with rearwardly extending apertured ears 34 for the passage of the bolt 30 whereby it is connected with the extension member 26 of one of the standards 25. The axle supports a suitable frame structure 35 carrying a rock shaft 36 having rearwardly extending arms 37, one for each topping unit, said arms being preferably mounted adjustably on the rock shaft so that they may be spaced variously apart in like manner as the clips 34. Each arm 37 is connected by a flexible member, such as a chain 38, with the staple 23 at the rear edge of the base plate of one of the topping units. The rock shaft 36 also has an upwardly extending arm 39 which is connected by a link 40 with one arm 41 of a lever fulcrumed on the frame at 42, and the other arm of which extends upwardly so as to provide a handle 43 within convenient reach of the operator for whom a seat 44 is provided. The arm 43 of the operating lever is provided with a stop member 45 of conventional construction adapted to engage a rack segment 46 mounted on the frame and whereby the parts may be retained in adjusted position.

It will be readily seen that by manipulating the operating lever the rock shaft 36 may be oscillated in such a manner as to raise or lower the cutter carrying base plates of the topping units from or to an operating position. When the base members of the topping units are lowered to the ground, the curved standards will engage the projecting portions of the beets, and the base plates will ride over the same, crushing the tops and causing said tops to be removed by the action of the diagonally disposed knife or cutter which will sever the top in a clean and efficient manner and without packing or injuring the beet which may be subsequently removed from the ground by a machine provided for the purpose. It is obvious that by proper adjustment of the knives, a greater or lesser portion of the beet top may be removed according to the condition of the crop. When the topping units are not in use they may be quickly raised to an elevated position for transportation.

A topping unit of the construction herein described may be readily connected with the beam 47 of an ordinary lifting plow, as seen in Fig. 7 of the drawings, thus enabling the farmer who raises but a small crop of sugar beets to avail himself of the advantages of this invention without necessity for investing in a complete machine.

Having thus described the invention, what is claimed as new, is:—

1. In a device for topping beets, a topping unit comprising a curved standard, a base plate connected therewith and having forwardly and rearwardly extending lugs at diagonally opposed corners, said lugs being provided with upwardly extending posts arranged in pairs spaced apart to provide vertical slots, a knife extending diagonally beneath the base plate and having upwardly extending vertically slotted ears, and fastening members connecting said ears with the upwardly extending posts of the base plate.

2. In a beet topping device, a supporting bolt, a curved standard having a member hingedly engaging said bolt, a base plate carried by the standard, and a knife extending diagonally beneath the base plate, in combination with means for adjustably supporting said knife to permit the distance between the knife and the base plate to be varied.

3. In a device for topping beets, a wheel supported axle, a plurality of clips mounted adjustably thereon, a plurality of topping units each having a curved standard hingedly connected with a clip and each of said topping units including a base plate, and a knife extending diagonally beneath said base plate and spaced therefrom, said knife being supported adjustably with respect to the base plate.

4. In a beet topping device, a wheel supported axle, clips adjustable on said axle, a plurality of beet topping units, each unit including a base plate, a knife extending diagonally beneath the same, means for adjustably supporting the knife, a curved standard connected with the base plate, and an extension member connected adjustably with said standard and hingedly with one of the clips, a frame supported on the axle, a rock shaft mounted on the frame and having rearwardly extending arms, a chain connecting each arm with the base plate of a topping unit, an operating lever, an arm extending upwardly from the rock shaft, a link connecting said arm with one arm of the operating lever, and means for securing the latter in adjusted position.

In testimony whereof I affix my signature in presence of two witnesses.

FRANK R. SUTTON.

Witnesses:
FRANK BARTIK,
JOHN P. BARRETT.

---

Copies of this patent may be obtained for five cents each, by addressing the "Commissioner of Patents, Washington, D. C."